United States Patent Office 3,197,268
Patented July 27, 1965

3,197,268
DISPERSE DYE DYEING OF ALKALI ALKALI TREATED POLYESTER-POLYURETHANE FOAM PRODUCTS
Guy Knafo, New York, N.Y., assignor to Nopco Chemical Company, Newark, N.J., a corporation of New Jersey
No Drawing. Filed May 25, 1962, Ser. No. 197,613
10 Claims. (Cl. 8—4)

The present invention relates to a novel process for dyeing polyester-polyurethane foam products. More specifically it relates to the production of dyed polyester-polyurethane foam products having improved hand and uniform dyeing characteristics.

Polyester-polyurethane foams are usually used in the textile field to add body and thermal insulation to fabric materials. The foam is normally in the form of a thin sheet which is laminated to the fabric to form a backing for the fabric. However, the use of raw unleached, undyed foam in the polyester-polyurethane textile laminates has been sharply limited by the poor hand and color of the finished laminate. The foams when produced are a porous expanded polymer which may be either an open cell foam or a reticulated structure. Open cell foams, while normally considered to be cellular, since they do have a substantial percentage of cell walls present, are porous because some of the cell walls have been destroyed during cellulation whereby there results an intercommunicating cell structure. A fully reticulated structure is not cellular since it contains no cell windows or walls. This structure is a three-dimensional network of strands joined anisotropically at points of junction.

An organic polyisocyanate derived polymer is a high molecular weight polymeric product prepared by the reaction of an organic polyisocyanate with organic compounds containing a plurality of active hydrogen atoms and a chain extending or cross-linking agent. These products can be either homogeneous or expanded. Where the organic compound is a polyester having predominantly terminal hydroxyl groups, the product is termed a polymeric polyester-polyurethane. Where the organic compound is a polyether (usually a polyalkylene ether glycol), the product is identified as being a polymeric polyether polyurethane. The term "polymeric polyurethanes" encompasses and is generic to a class comprising polyester-polyurethanes and polyether-polyurethanes.

Open celled polyester-polyurethane foam products are well known in the art. Such cellular structures are sometimes referred to as low density foams, since they contain a minimal weight of polymer for the volume occupied by the mass. Methods whereby foamed open-cell cellular structures may be produced, as by the use of blowing agents and similar techniques for the incorporation of gas bubbles or vapor in a reaction mass containing a polyisocyanate and a polyester, are fully described in published literature. Such foamed products generally possess moderate tear-strength and varying degrees of softness and porosity depending upon the basic polymer utilized as well as the particular procedures employed in the cellulation of these foamed products. These products are resistant to dyes due to the fact that non-foamed membranes are present within the foamed material which prevent even and effective penetration of dyestuffs throughout the polyurethane foam.

Resultant, low density polyester-polyurethane foamed products are ideally suited for use in the textile and garment industry. Sheets of these foamed products can easily be laminated to a textile fabric. Such a lamination results in a product having greatly improved thermal insulation, draping and body characteristics, without adding greatly to the weight of the original fabric material so laminated. Thus it is readily apparent that light weight draperies and clothing apparel can easily be made from such laminated material. These laminated products have excellent appearance and thermal insulation characteristics when low cost fabrics such as cottons and synthetics are utilized as the fabric material in the lamination. However, widespread acceptance of such laminates has been greatly impeded due to the aforementioned difficulties in dyeing the polyester-polyurethane foam products, since the foam contained in such laminated product is clearly visible in most instances to the consumer.

The difficulty in dyeing polyester-polyurethane foamed products arises due to the fact that membranes present in such foamed products prevent a level, even dyeing of the product. This results in the fact that dyestuffs such as dispersed dyestuffs cannot effectively penetrate throughout the foam material. Thus an even level dyeing of the foam cannot be obtained.

To overcome this problem, many in the art have resorted to placing pigments in the reaction mass prior to formation of the foam product, thereby producing a colored polyester-polyurethane foam product. However, this method has many serious drawbacks. First, the pigments used in such an operation are very expensive. Second, the color to be utilized in the final laminated product must be predetermined prior to manufacture of the foam to be utilized in the laminate and in the fashion world where constantly changing color vogues are the pattern, this is extremely disadvantageous. Third, the catalysts utilized in the production of polyester-polyurethane foam products tend to diminish the color tone of pigments so used. Also, it is difficult to uniformly disperse the pigment into the components of the reaction mass so as to obtain a uniformly colored foamed product. Further, the polyester-polyurethane foam product and the fiber material to which it is to be laminated must be colored separately, thus greatly increasing cost of the laminate.

The use of dispersed dyestuffs to dye polyester-polyurethane foam products and textile laminates thereof in aqueous dyebaths has been tried, but its effectiveness is sharply limited due to the splotchy results obtained from lack of even penetration of the dyestuff throughout the material. Even, when attempts are made to dye polyester-polyurethane foam products containing relatively few membranes in an aqueous dyebath, the penetration of the dyestuff throughout the polyester-polyurethane foam product is inadequate and the aged dyed product has an off-color appearance, e.g., black dyed products look gray.

Some in the field, in order to improve the appearance of the laminates, have covered the foam contained in the laminate with a colored fabric backing and others have even utilized a laminate in which the polyester-polyurethane foam product is sandwiched between two layers of fiber materials. Obviously this sharply increases the cost of such products.

It is an object of this invention to provide a novel one step process for dyeing polyester foam products.

It is a further object of this invention to provide a soft-to-the-touch, true colored polyester-polyurethane foam.

It is a further object of this invention to provide an easily operable economical method of dyeing polyester-polyurethane foam products and textile laminates thereof with dispersed dyestuffs.

It is a further object of this invention to provide polyester-polyurethane foam products and laminates thereof having improved hand and appearance.

Other objects of this invention will in part be obvious and will in part appear hereinafter.

I have unexpectedly discovered that polyester-polyurethane foam products and laminates thereof having improved color and hand can be readily produced by dyeing these foam materials by immersion in an aqueous dyebath containing an alkali compatible dispersed dyestuff and a strong alkali. The foam material which is dyed can thereafter be rinsed to remove any excess dye and then subsequently treated in the normal manner. The foam material so produced no longer exhibits its usual shininess. The dyed foam is soft to the feel and true colored, since the windows in such materials have been removed. In this manner a uniformly dyed foam which has a good appearance and hand is produced.

The process of this invention may be carried out in one step by dipping or immersing the polyester-polyurethane foams or laminantes thereof in the dyebath containing the alkali and the dispersed dyestuff. Dyeing can take place within two to three minutes after immersion or dipping depending upon the concentration of the alkali, and the dyestuff and the temperature of the bath. By the method of this invention, a smooth, even and adequate dispersion of the dyestuff is obtained within the polyurethane foam or laminates thereof resulting in a uniform and deep coloration throughout the polyurethane foam or laminate thereof.

Alternatively, the improved dyeing process of this invention may be carried out by treating the polyurethane foam at room temperature or elevated temperatures with a strong alkali before immersion into the dyebath. In utilizing this procedure the polyester-polyurethane foam is first treated with the alkali by immersing or dipping the foam into an aqueous alkali solution having a pH of between 8.5 and 14 before immersion into the dyebath. After immersion into the dyebath, a uniform and deep coloration of the foam is obtained.

The phenomena whereby a uniform and deep penetration of polyester-polyurethane foams and laminates thereof by dyestuffs, as well as the improved appearance and hand of the foams, are obtained by dyeing with a dispersed dyestuff while simultaneous or prior treating the polyester-polyurethane foam or laminate thereof with an alkali is not completely understood, however, it is believed that such effects as noted are due to the destruction of the windows or cell membranes within the foam as well as the attack upon the outside surface or skin of the foam by the alkali and the disperse dyestuff thereby increasing permeability and penetrability of the foam so that the foam may be penetrated evenly and uniformly by the dispersed dyestuffs.

The dyeing and the alkaline treatment may be carried out simultaneously or consecutively at room temperature in usually between 40 to 70 minutes depending upon concentration of the dyestuff and the alkali. In the case of prior treatment by alkali, the alkaline treatment usually takes between 40 to 70 minutes at room temperature. If quicker dyeing times are desired or if low concentrations of dyestuff and alkali are utilized, the dyeing and alkaline treatment may be carried out at elevated temperatures such as 60° C. or more.

Dyeing may be carried out in an open vessel. The dyeing may proceed in the conventional manner. The dyebath may comprise an aqueous system and may contain any of the conventional carriers to regulate and control the dyeing of the polyester-polyurethane foam by means of the dispersed dyestuff. Typical carriers include trichlorobenzene, dichlorobenzene, benzoic acid, ortho phenyl phenol, biphenyl, methyl silicylate, etc. and mixtures thereof. In conjunction with the carriers, dispersing agents such as ethoxylated dioctyl phenol, sulfonated triglycerides, amide imidazolines, etc. may be incorporated in the dyebath in order to control and regulate the solubility of the dyestuff in the aqueous dyebath so that the dyestuff may efficiently exhaust from the bath onto the polyester-polyurethane foam. These dispersing agents may include any of the conventional nonionic, anionic and cationic types. Typical dispersing agents which can be used in the dispersed dyebath of this invention are disclosed by Epstein et al., U.S. Patent 2,190,133, February 13, 1960, Schoeller et al., U.S. Patent 1,970,578, August 21, 1934, and Neelmeir et al., U.S. 1,947,951, February 20, 1934. The carrier and dispersing agent may be omitted from dyebath without deleteriously affecting the dyeing of the foam. This is true since I have found that uniform and even dyeing of the polyester-polyurethane foam may be accomplished by utilizing only the aqueous dispersed dyestuff bath and the alkali agents. The incorporation of the carrier and the dispersing agents into the dyebath aid in regulating and controlling the solubility of dispersed dyestuffs in the dyebath.

As the alkali which may be utilized in my novel process are any dilute or concentrate aqueous alkalis. The alkaline material may be any of the common alkali agents such as the alkali hydroxides, like sodium hydroxide, potassium hydroxide, ammonium hydroxide, quaternary ammonium bases such as benzyl trimethyl ammonium hydroxide; amines such as methyl amine, ethyl or triethyl amine, etc. alkaline salts such as trisodium phosphate and the like. The amount of alkali that will be employed in the dyebaths, or in the pre-treating step, in carrying out the process disclosed in this invention should be sufficient to maintain the pH of the treating solution or dyebath at above about 8.5, preferably within the range of 10 to 14. Of course, the amount of alkali itself so as to produce a pH of the treating solution or dyebath within the aforementioned range depends on the dyeing temperature and the immersion time of the foam so as to permit adequate penetration of the dyestuff onto the polyester-polyurethane foam product which is to be dyed. My invention is not bound by the particular alkaline material used in the dyebath or in the treating solution, the amount of alkali, or the temperature at which it is used. These things are well known in the art and can be easily determined by simple experimentation.

Any conventional polyester-polyurethane foam resin may be dyed by means of an aqueous alkali dyebath containing compatible dispersed dyestuffs. These foam polyurethane resins are the final reaction products of a polyester resin with a polyisocyanate in the presence of a blowing agent such as water, an activator and/or a surface active agent. These foam resins are formed by means of a total prepolymer system, i.e., where a branched chain polyester resin is reacted in the absence of a blowing agent such as water with an excess over stoichiometric amount of polyisocyanate and the foam resin is formed by mixing this reaction product with a blowing agent such as water, an activator and/or a surface active agent; by means of apartial (quasi) prepolymer system, i.e., where a branched chain polyester resin is reacted in the absence of a blowing agent such as water with an excess over a stoichiometric amount of polyisocyanate and the foam resin is formed by mixing this reaction product with a branched chain polyester resin, a blowing agent such as water, an activator and/or a surface active agent, or a one-shot system, i.e., where a polyester resin, a polyisocyanate, a blowing agent and an activator or catalyst are brought into intimate contact by agitation to form the foam resin.

Typical polyester resins, polyisocyanates, activators, surface active agents, for producing the polyester-polyurethane foam which can be dyed in accordance with this invention are disclosed by the Hoppe U.S. Patent 2,764,565; Hurwitz et al., U.S. Patent 3,003,977, October 10, 1961; Denis, U.S. Patent 2,906,642 and U.S. Patent 2,906,643, September 29, 1959. By use of the method of this invention, it is possible to dye any conventional polyester-polyurethane foam.

The amount of dispersed dyestuff which can be utilized in dyeing the polyurethane foam varies from about 0.05% to 5.0% based upon the weight of the polyurethane foam to be dyed. Generally, up to about 2.5% of dispersed dyestuff can be used based on the weight of the foam in the dyebath. Of course, excess amounts of dyestuffs, that is, over 5.0% by weight could be employed, however no practical benefits are obtained by using an excess of this dyestuff since in most cases no more than 5.0% of the dyestuff, based on the weight of the foam to be dyed will exhaust on the foam. Dyestuff concentrations lower than 0.05% by weight may be utilized, but in most cases such low concentrations give light shades which may be unacceptable to the commercial public.

Examples of typical dispersed dyestuffs that can be utilized in dyeing the polyurethane foam are the following:

| Name: | Color index # |
|---|---|
| C.I. Dispersed Red 4 | 60755 |
| C.I. Dispersed Red 9 | 60505 |
| C.I. Dispersed Red 11 | 62015 |
| C.I. Dispersed Red 15 | 60710 |
| C.I. Dispersed Red 41 | 11040 |
| C.I. Dispersed Blue 1 | 64500 |
| C.I. Dispersed Blue 3 | 61505 |
| C.I. Dispersed Blue 5 | 62035 |
| C.I. Dispersed Blue 6 | 62050 |
| C.I. Dispersed Blue 9 | 61115 |
| C.I. Dispersed Blue 14 | 61500 |
| C.I. Dispersed Violet 1 | 61100 |
| C.I. Dispersed Yellow 3 | 11855 |
| C.I. Dispersed Yellow 4 | 12770 |
| C.I. Dispersed Yellow 5 | 12790 |
| C.I. Dispersed Yellow 7 | 26090 |
| C.I. Dispersed Yellow 11 | 56200 |
| C.I. Dispersed Orange 3 | 11005 |

The above dispersed dyestuffs are merely exemplary and are not to be construed in a limiting sense, since dispersed dyestuffs are well known and are a clearly defined class of dyestuffs all of which can be utilized to dye polyester-polyurethane foams in accordance with this invention.

The length of time required for the dyestuff to affix itself to the foam usually varies from about 1 to about 90 minutes depending upon the dyestuff, the alkali, the temperature, and the concentration of the dyestuff used. After the foams have been dyed, they can be rinsed in water or other solvents which will not displace the dyestuff or harm the foam to remove excess dyestuff. The temperature of the rinse may vary from 10° C. to 100° C. Preferably, the foams are rinsed with water having a temperature of about 20° C. for about one minute.

If a carrying composition is utilized, any components of this carrying composition which remain on the foam may be removed by scouring, washing, thermal drying, aerating or any other procedure that will completely remove these residual compounds from the foam. Thermal drying with constant aeration is preferably used. Care should be taken to avoid damage of the foam at elevated temperatures. Scouring, which is another method of removing the carrying composition from the foam, can easily be accomplished by immersing the foam in an aqueous bath consisting of about 0.1% by weight of the foam of trisoduim phosphate. The method of removal of these residual components are well known in the art and may be easily determined by those well skilled in the art.

The dyed foam may be aged at room temperature to increase its colorfastness. The period of aging required may vary from 12 to 48 hours depending on the foam and the dyestuffs used. Aging is usually carried out at room temperature, temperatures above this may also be utilized. Generally the dyed foams are aged for about 24 hours at room temperature.

My invention can be used with continuous flow dye systems such as the pad and slasher system.

For further understanding of the nature and objects of my invention, reference may be made to the following examples of this invention.

In Examples II through VIII listed below, each dyebath contained 20 grams of foam and 500 grams of water. All foams were removed from the dyebath upon completion of the dye process and were rinsed for one minute in a stream of water having a temperature of about 20° C. to remove any excess components of the dye system remaining on the dyed foam.

The residual components of the dyebath remaining on the rinsed foam were then removed by scouring the foam with air having a temperature of about 240° F. for one hour. After scouring to remove the residual components, the foams were placed in the beaker containing a scouring solution made up of 200 grams of water and containing 0.1 gram of trisodium phosphate. The foam was scoured by constant agitation for 10 minutes in the scouring solution, which solution had a temperature of 20° C. All the foams were aged at room temperature for 24 hours before determining the amount of dyestuff build-up and the colorfastness of the foams.

The amount of dyestuff fixed on the foam or the dyestuff build-up was determined visually by comparing the shade, tone and depth of the color of the dyed foam with the sample of foam in the control bath which contained no alkali. Colorfastness was determined by washing the foams in a solution of 200 grams of water and 0.1% of sodium stearate for three minutes. The temperature of the wash water was 140° F. The degree of colorfastness was determined by the amount of color of the washing solution resulting from separation of the dyestuff from the dyed foam. Colorfastness was also determined by wrapping the dyed foams in a sheet of paper to see if any of the dyestuff rubbed off. In all examples, a control was carried out for comparative purposes. The control was performed in the same manner as a regular example except that an alkali or an alkaline agent was not added to the dyebath.

*Example I*

This example is directed to the preparation of the polyester-polyurethane foam by means of a one shot system.

100 parts by weight of a polyester prepared from 55.3 parts by weight of adipic acid, 43.8 parts by weight of diethylene glycol and 0.89 part by weight of trimethylol propene, held at a temperature of 22° C., 50 parts by weight of toluene diisocyanate (80% 2,4-, 20% 2,6), held at a temperature of 18° C., and 9.2 parts by weight of an activator mixture as described below, held at a temperature of 18° C., were brought together using the mixing apparatus described in FIGURE 4 of the Hoppe U.S. Patent 2,764,565. The activator mixture consisted of 3.7 parts by weight of water, 1.5 parts by weight of N-ethyl morpholine, 2.0 parts by weight of N-lauryl morpholine, 1.0 part by weight of diethanol amine oleate and 1.0 part by weight of sulphonated castor oil. The foam rose and set in about 6 to 8 minutes. Its density was about 1.8 lbs. per cubic foot.

*Example II*

In this example, a dyebath was prepared by adding 0.5 gram of Artisil Direct Blue BSR, Color Index 61055, dispersed dyestuff and 50 grams of potassium hydroxide to 500 ml. of water. 20 grams of the polyester foam prepared in Example I were immersed in the dyebath. The dyebath had a pH of about 13. The temperature of the dyebath was maintained at about 60° C. After ten minutes at this temperature, the foam was removed from the dyebath. The dyed foam exhibited good dyestuff build-up and good colorfastness properties. The controlled dyed foam exhibited little dyestuff build-up and poor colorfastness properties.

*Example III*

The same procedure as in Example II was followed utilizing the same components except that the amount of potassium hydroxide utilized in the dyebath was 25 grams and the foam was dyed at a temperature of 30° C. for about 1 hour. The dyed foam exhibited good dyestuff build-up and good colorfastness properties. The controlled dyed foam exhibited little dyestuff build-up and poor colorfastness properties.

Example IV

In this example, a dyebath was prepared by adding 0.5 gram of Artisil Direct Black WAB dispersed dyestuff and 25 grams of sodium hydroxide in 500 ml. of water. 20 grams of the polyester foam prepared in Example I were immersed in the dyebath. The temperature of the dyebath was maintained at about 60° C. After 20 minutes at this temperature, the foam was removed from the dyebath. The dyed foam exhibited good dyestuff build-up and good colorfastness properties. The controlled dyed foam exhibited little dyestuff build-up and poor colorfastness properties.

Example V

In this example, a dyebath was prepared by adding 0.5 gram of Artisil Direct Yellow G, Color Index 11855, dispersed dyestuff and 50 grams of sodium hydroxide to 500 ml. of water. 20 grams of the polyester foam prepared in Example I were immersed in the dyebath. The dyebath was maintained at a temperature of about 60° C. After ten minutes at this temperature, the foam was removed from the dyebath. The dyed foam exhibited good dyestuff build-up and good colorfastness properties. The controlled dyed foam exhibited little dyestuff build-up and poor colorfastness properties.

Example VI

In this example, a dyebath was prepared by adding 0.5 gram of Artisil Direct Red BLS P.A.T dispersed dyestuff and 25 grams of potassium hydroxide to 500 ml. of water. 20 grams of the polyester foam prepared in Example I were immersed in the dyebath. The temperature of the dyebath was maintained at about 100° C. After ten minutes at this temperature the foam was removed from the dyebath. The dyed foam exhibited good dyestuff build-up and good colorfastness properties. The controlled dyed foam exhibited little dyestuff build-up and poor colorfastness properties.

Example VII

In this example, the same procedure was followed as in Example VI except that 50 grams of potassium hydroxide were used, and the foam was dyed at a temperature of 60° C. for a period of five minutes. The dyed foam exhibited good dyestuff build-up and good colorfastness properties. The controlled dyed foam exhibited little dyestuff build-up and poor colorfastness properties.

Example VIII

In this example, a dyebath was prepared by adding 0.5 gram of Acetosol Brown RLS PAF dispersed dyestuff and 50 grams of potassium hydroxide to 500 ml. of water. 20 grams of the polyester foam prepared in Example I were immersed in the dyebath. The dyebath was maintained at a temperature of about 60° C. After ten minutes at this temperature, the foam was removed from the dyebath. The dyed foam exhibited good dyestuff build-up and good colorfastness properties. The controlled dyed foam exhibited little dyestuff build-up and poor colorfastness properties.

Having described my invention what I claim is new and desire to secure by Letters Patent is:

1. A method of dyeing polyester-polyurethane foam products and laminates thereof which comprises applying an alkali to a polyester-polyurethane foam containing a branched chain polyester formed by reacting a compound selected from the group consisting of an aliphatic dicarboxylic acid and an aliphatic monoanhydride with an aliphatic polyol, and dyeing said foam in an aqueous dyebath containing a dispersed dyestuff.

2. The method of claim 1 wherein the pH of said alkali is above 8.5.

3. The method of claim 1 where the dyebath is maintained at a temperature of about 20° C. to about 100° C.

4. The method of claim 1 wherein the concentration of said dispersed dyestuff in said dyebath is from 0.05% by weight to 5.0% by weight based on the weight of the foam.

5. A method of dyeing polyester-polyurethane foam products and laminates thereof which comprises dyeing, in an aqueous dyebath containing an alkali and a dispersed dyestuff, a polyester-polyurethane foam containing a branch chain polyester formed by reacting a compound selected from the group consisting of aliphatic dicarboxylic acids and aliphatic mono anhydrides with an aliphatic polyol.

6. A process of producing polyester-polyurethane foam products and laminates thereof having an improved hand and color comprising applying to a polyester-polyurethane foam containing a branched chain polyester formed by reacting a compound selected from the group consisting of an aliphatic dicarboxylic acid and an aliphatic monoanhydride with an aliphatic polyol, an aqueous bath containing an alkali and at least 0.05% by weight of a compatible dispersed dyestuff, based on the weight of the foam, maintaining the pH of said bath at above 8.5, said application being carried out at a temperature of from about 20° C. to about 100° C., for a period of from about 1 to about 70 minutes and thereafter removing said foam from said bath.

7. The process of claim 6 wherein said foam is subsequently rinsed after removing from said bath.

8. The process of claim 6 wherein the temperature of said dyebath is maintained between 20° C. to 60° C.

9. The process of claim 6 wherein the concentration of dyestuff in said dyebath is from 0.1% to 2.5% by weight based on the weight of the foam.

10. The process of claim 6 wherein the pH of the dyebath is from about 10 to 14.

References Cited by the Examiner

UNITED STATES PATENTS 2,347,143    4/44    Wilcock.
3,036,979    5/62    Wittbecker _____ 260—31.2

FOREIGN PATENTS 620,248    5/61    Canada.

OTHER REFERENCES

Newman, American Dyestuff Reporter, Aug. 21, 1961, pp. 40–44.

Vickerstaff, The Physical Chemistry of Dyeing, 2nd Edition, pub. by Interscience Pub. Inc., N.Y.C., 1954, pages 442–449, 467 and 484–487.

NORMAN G. TORCHIN, *Primary Examiner.*

ABRAHAM H. WINKELSTEIN, *Examiner.*